(No Model.) 3 Sheets—Sheet 1.

J. H. GREINER.
TRAVELING CRANE.

No. 447,281. Patented Feb. 24, 1891.

Witnesses:
S. Cotton
S. H. Knight

Inventor:
J. H. Greiner,
By Knight Bros.
Attys.

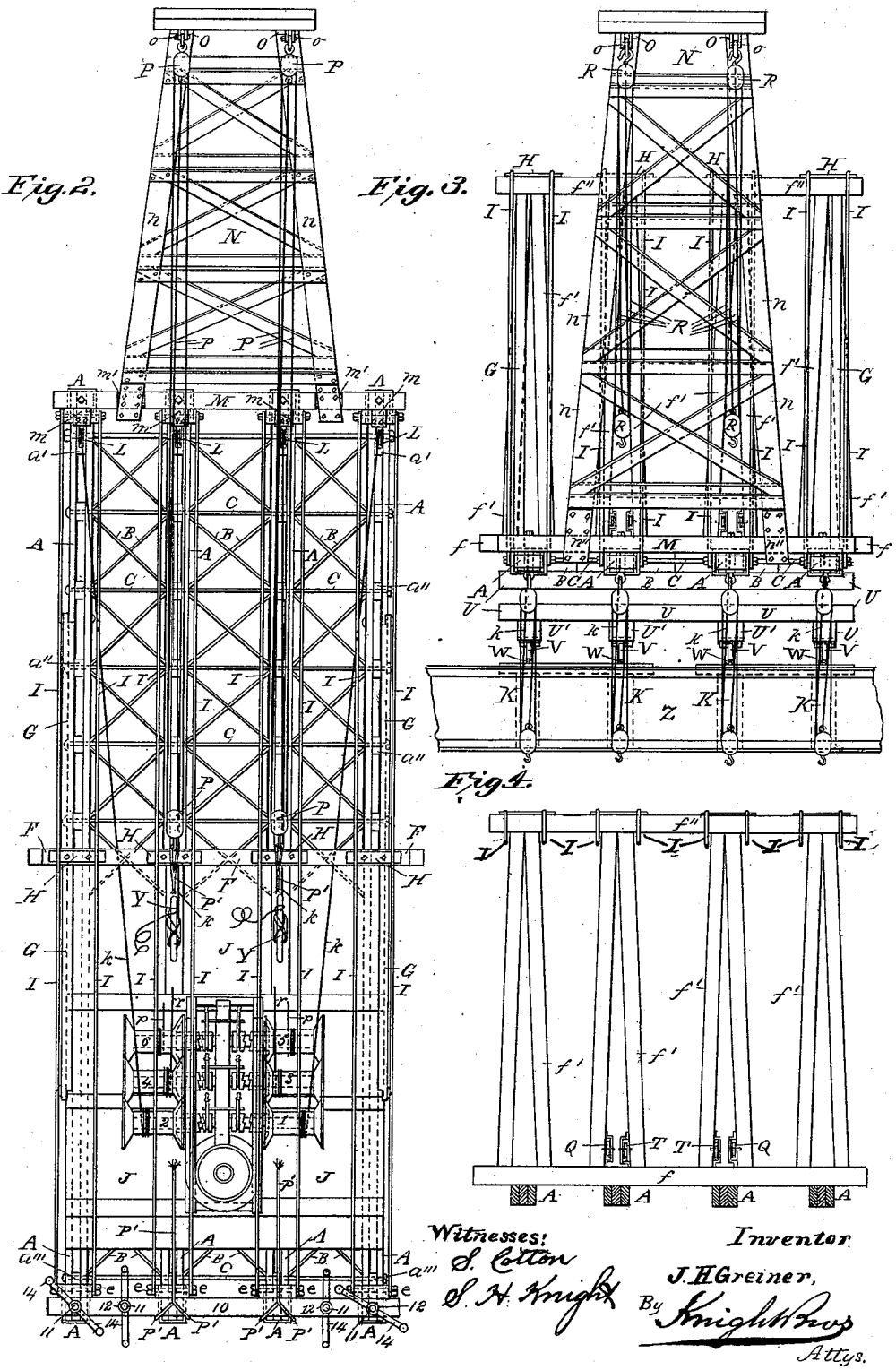

(No Model.) 3 Sheets—Sheet 3.

J. H. GREINER.
TRAVELING CRANE.

No. 447,281. Patented Feb. 24, 1891.

Witnesses:
S. Cotton
S. H. Knight

Inventor:
J. H. Greiner,
By Knight Bros
Attys.

UNITED STATES PATENT OFFICE.

JACOB H. GREINER, OF LANCASTER, ASSIGNOR TO JOSEPH H. COFRODE, OF PHILADELPHIA, PENNSYLVANIA.

TRAVELING CRANE.

SPECIFICATION forming part of Letters Patent No. 447,281, dated February 24, 1891.

Application filed November 7, 1890. Serial No. 370,649. (No model.)

*To all whom it may concern:*

Be it known that I, JACOB H. GREINER, a citizen of the United States, residing at Lancaster, in the county of Lancaster and State of Pennsylvania, temporarily residing in Chicago, in the county of Cook and State of Illinois, have invented certain new and useful Improvements in Traveling Cranes, of which the following is a specification.

This invention consists in certain features of novelty that are particularly pointed out in the claims hereinafter, a crane embodying it being first fully described with reference to the accompanying drawings, which form a part of this specification, and of which—

Figure 1:
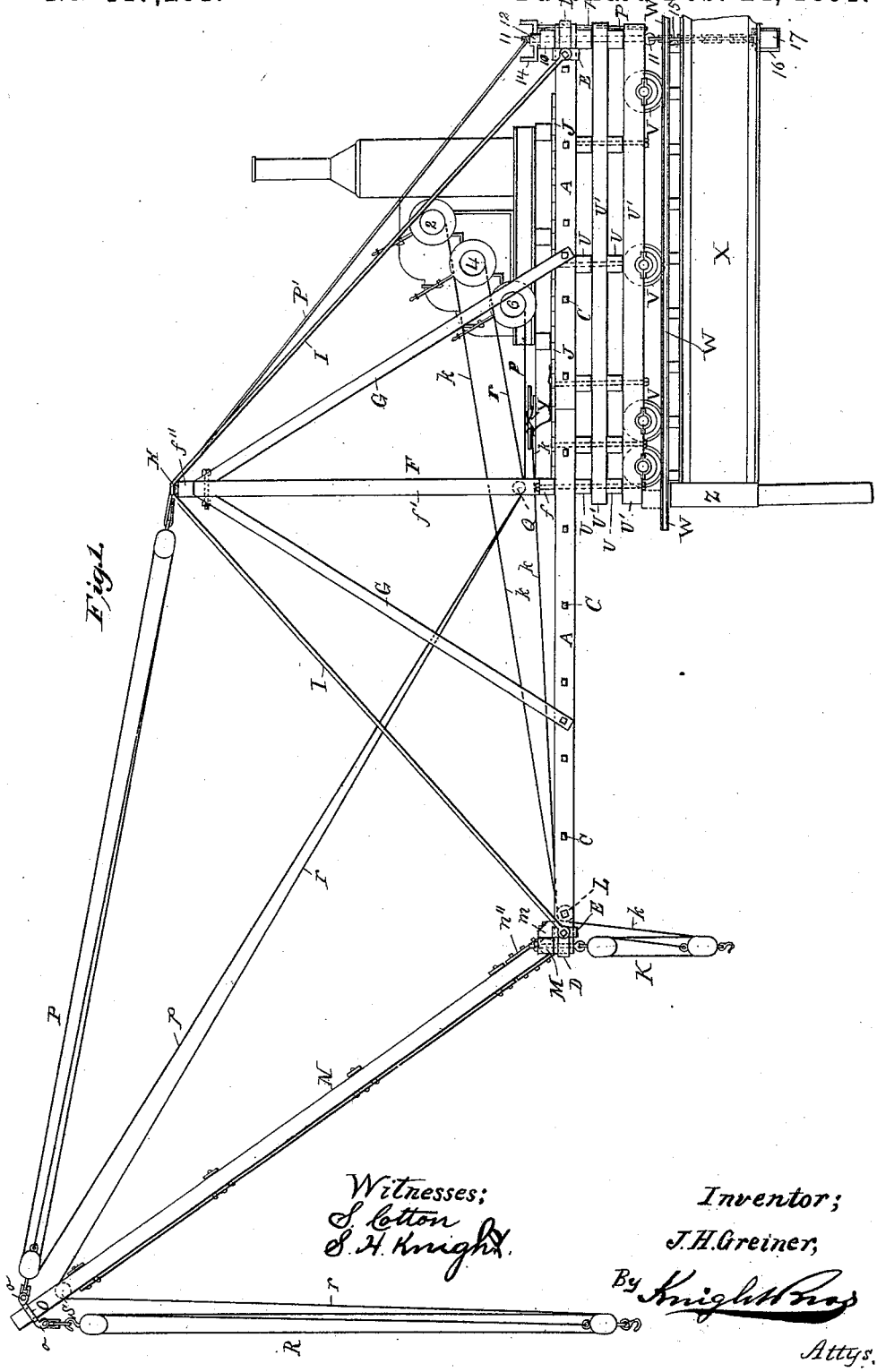
Figure 5:
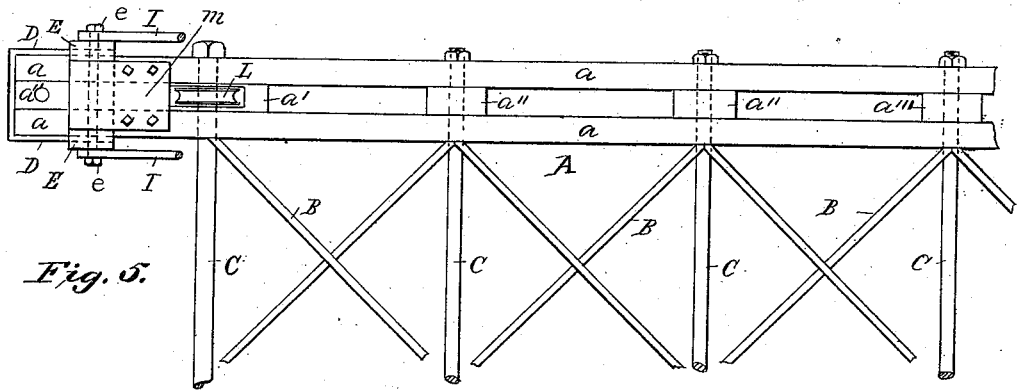
Figure 6:
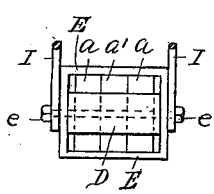
Figure 7:
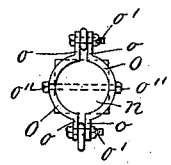
Figure 8:
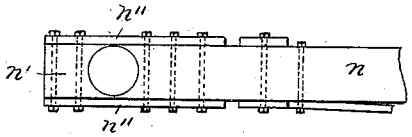
Figure 9:
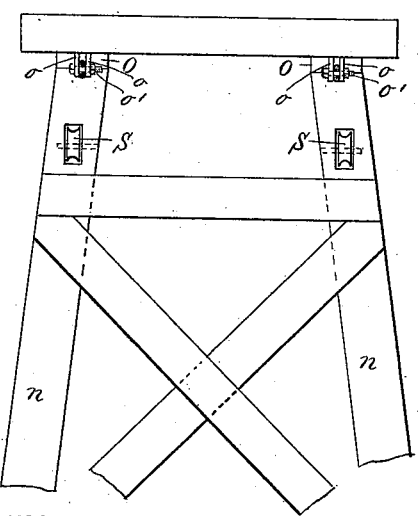
Figure 10:
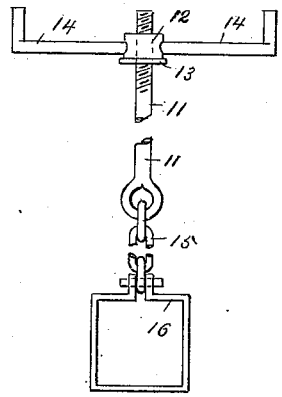

Figures 1, 2, and 3 are respectively a side elevation, a plan, and a front elevation of said crane. Fig. 4 is a view showing the trestle thereof in front elevation, the horizontal booms in transverse section, and portions of the truss-rods in elevation. Fig. 5 is a plan view of one end of one of the booms and its accessories. Fig. 6 is an end elevation of said boom. Figs. 7, 8, and 9 are elevations showing in detail various parts of the hinged boom. Fig. 10 is an elevation, with portions broken away, of one of the anchors.

In Figs. 5 to 10, inclusive, the parts are shown on a larger scale than in Figs. 1 to 4.

The crane shown in the drawings is designed for constructing a double-track elevated railway having four longitudinal stringers; but it is of course equally well adapted without alteration for constructing bridges, viaducts, or other structures having the same or a less number of stringers similarly placed. It has four fixed horizontal booms A, held at the proper distances apart by lateral braces or diagonals B, placed between them in the manner which is well known and clearly shown in Fig. 5. At the points where the braces abut against each other and against the sides of the horizontal booms lateral brace-rods C pass through all four booms and hold them securely together. Each of these horizontal booms is constructed of two parallel timbers *a* of the requisite width and thickness, held apart a distance about equal to the thickness of one of them by packing-blocks *a'*, *a''*, and *a'''*, situated, respectively, at the front and rear ends of the boom and at the points through which the lateral brace-rods C pass.

Passing horizontally around each end of the boom and extending along its sides for a short distance is a metallic strap D, and passing completely around it vertically and embracing the ends of the strap is a metallic band E, the end of the boom, the strap, and the band being all perforated horizontally for the passage of a bolt *e*.

Rising vertically from the center of the horizontal booms is a trestle F, the construction of which is shown more clearly in Fig. 4. It consists of a sill *f*, crossing all four booms, eight legs *f'*, stepped onto the sill, and a cap *f''*, resting on the upper ends of the legs. The legs are arranged in pairs that touch at top and diverge downward, one pair being situated directly over each of the fixed booms. The trestle thus constructed is held in upright position by inclined braces G, which bear at their lower ends upon the booms A, and at their upper ends are secured to the trestle near its top.

Passing over the trestle and bearing upon it through the medium of metallic plates or saddles H are eight truss-rods I, each connected at its opposite ends to the opposite ends of one of the booms A (one rod on each side of each boom) by means of the bolts *e*.

J represents flooring laid over the booms in rear of the trestle, providing a suitable platform for the operators. Upon this platform is placed the engine, which may be of any desired construction, so long as it has the requisite number of winches capable of being operated either separately or two or more together.

The engine shown in the drawings has six, (numbered 1 to 6, inclusive,) but eight could be used to advantage.

Depending from the outer end of each of the fixed booms A is a hoisting-tackle K, the fall *k* of which passes over a sheave L, journaled in an opening cut through a packing-block *a'*, and thence to the engine, as presently described.

Resting upon and crossing the outer ends of all of the booms is a beam M, held down by the bolts that extend down through it and through the ends of the booms for supporting the tackles K. This beam is held against lateral displacement horizontally by four heavy blocks $m$, which are placed against its rear side and bolted to the fixed booms A. Between the outer booms the beam M is rounded to afford journals $m'$ for a hinged boom N, constructed of two pieces of timber $n$, converging outward and held together by suitable lateral braces and a cap-piece. The inner ends of the timbers $n$ are provided with semi-circular sockets which fit the journals $m'$, the other halves of the sockets being formed in blocks $n'$, held in place by plates $n''$, bolted to them and to the timbers $n$, as shown more clearly in Fig. 8. The upper end of each of the timbers $n$ is rounded off and is embraced by a collar O, formed in two parts, having lugs $o$ on their meeting ends perforated for the passage of bolts $o'$, by which they are secured together.

For additional security a bolt $o''$ is passed diametrically through the timber and collar, as shown in Fig. 7. The bolts $o'$, which are situated on the top side of the hinged boom, also constitute the means for attaching to the hinged boom the ends of guys P, which consist in part of blocks and tackle and in part of wire cables P'. The block-and-tackle part of the guys extends nearly to the trestle F and there connects with the cables P', which pass over the said trestle, (bearing upon the saddles H,) thence rearward and downward, bearing upon a beam 10, which rests upon the rear extremities of the fixed booms A, and thence downward, their lower ends being anchored to the bottom sills of the structure. The falls $p$ of the guys extend downward and rearward, passing beneath sheaves Q, journaled to the trestle F near the bottom thereof, and thence to the engine, one to winch 5 and the other to winch 6.

Depending from the bolts $o'$ on the under side of the boom are two sets of hoisting-tackle R, the falls $r$ of which pass over sheaves S, journaled in openings cut through the timbers $n$ near the outer end of the boom, thence under sheaves T, journaled to the trestle F, and thence to the engine, one to winch 3 and the other to winch 4.

The platform end or rear ends of the fixed booms A, from, say, their centers to their rear extremities, are supported by sills U and U', placed alternately transversely and longitudinally, the longitudinal sills being directly beneath the booms, and the whole secured together by heavy bolts passing through them at their points of intersection.

To each of the four longitudinal sills U' of the bottom series four flanged track-wheels V are journaled.

The crane thus constructed stands upon the track-rails W of the road, and for operation is run up to the end of the section last completed, so that its booms project over the place where the next section is to be erected, as shown more clearly in Fig. 1. In this position one of the longitudinal stringers X of the next section is attached to each of the four sets of tackle K and said stringers hoisted to position, one after another. If desired, each of the four falls $k$ may have a separate winch; but as shown in the drawings only two winches 1 and 2 are devoted to this part of the work. With this arrangement the two inside stringers are hoisted into place first and their falls $k$ snubbed onto cleats Y, secured to the platform. The winches 1 and 2 are then left free for hoisting the remaining two stringers. All four stringers when hoisted have to be held in place until the transverse girder Z, which is to support their outer extremities, is put in place. This girder is attached to the hoisting-tackle R, the falls $r$ of which are wound simultaneously upon the winches 3 and 4, respectively. The near one of these falls is shown complete in Fig. 1; but in Figs. 2 and 3 portions of them are omitted in order to avoid confusion. This is also true of the falls $p$, by which the hinged boom is raised or lowered, and of the cables P', forming portions of the guys of said boom. When in operation the weight is taken off of the front wheels V by driving a block under the bottom sills U', as suggested by dotted lines in Fig. 1. The sole object of the crossed sills U and U' is to bring the fixed booms A a sufficient distance above the tops of the stringers X to permit the necessary upward movement of the lower blocks of the hoisting-tackle K in lifting said stringers to place.

In order to prevent the weight put upon the booms from elevating the platform end of the structure, the rear ends of the fixed booms A are held down by anchors constructed as shown in Fig. 10. Heavy eyebolts 11 pass through the sills U U' at their intersections, and also through the rear ends of the booms A and the beam 10 that rests upon them. Upon the screw-threaded upper ends of these bolts are turned heavy nuts 12, which bear upon the beam 10 through the medium of washers 13, and are provided with handles 14 for tightening them. To the eyes at the lower extremities of these bolts are connected the upper ends of chains 15, to the lower ends of which are attached stirrups 16, that fall a little below the under sides of stringers X, and in these stirrups is placed a beam 17, which bears upward against said stringers when the nuts 12 are tightened and prevent the crane from tipping.

The crane shown in the drawings, as before stated, is designed for erecting structures having four longitudinal stringers; but it is obvious that by increasing or decreasing the number of the fixed booms all the essential features may be embodied in a crane for structures having a greater or less number of stringers.

Having thus described my invention, the following is what I claim as new therein and desire to secure by Letters Patent:

1. The combination of a fixed horizontal boom, a hinged boom supported at the outer end of said fixed boom, a guy for sustaining the outer end of said hinged boom, and hoisting-tackle depending from both of said booms, substantially as set forth.

2. The combination of fixed horizontal booms, a hinged boom supported at the outer ends thereof, a guy for sustaining the outer end of said hinged boom, and hoisting-tackle depending from the fixed booms and the free end of hinged boom, substantially as set forth.

3. The combination of a plurality of fixed horizontal booms, a trestle rising therefrom, truss-rods bearing upon said trestle and connected at their ends to the outer ends of said fixed booms, a hinged boom supported at the outer ends of said fixed booms, a guy for sustaining the outer end of said hinged boom, and hoisting-tackle depending from the fixed and hinged booms, substantially as set forth.

4. The combination of a plurality of fixed horizontal booms, the beam M, resting upon their outer ends, the block $m$, secured to said booms behind said beam, the boom N, hinged to said beam, a guy for sustaining the outer end of the hinged boom, and hoisting-tackle depending from the fixed and hinged booms, substantially a set forth.

5. The combination of a plurality of fixed booms, a hoisting-tackle depending from each, a sheave L, journaled to each boom, over which the falls of said tackle pass, a hinged boom supported at the outer ends of said fixed booms, a guy for sustaining the outer end of the hinged boom, and hoisting-tackle depending from the outer end of said hinged boom, substantially as set forth.

6. The combination, with the horizontal booms and the hoisting-tackle depending from the outer ends thereof, of the sills U U', upon which said booms rest and from which they project, anchors for holding said booms down, a hinged boom supported at the outer ends of said horizontal booms, and hoisting-tackle depending from the outer end of the hinged boom, substantially as set forth.

7. The combination, with the horizontal booms A, the hoisting-tackle depending therefrom, and the sills upon which said booms rest and from which they project, of anchors consisting of eyebolts 11, nuts 12, having handles 14, the chains 15, the stirrups 16, and the beam 17, substantially as set forth.

8. The combination, with the fixed booms, the hinged boom supported at the outer ends thereof and the hoisting-tackle depending from said booms, of the trestle F, and the guys for sustaining the outer end of the hinged boom, consisting of the block and tackle P, having fall $p$, and the cable P', resting upon the trestle F and anchored at the rear extremity of the fixed booms, substantially as set forth.

9. The combination, with a plurality of fixed horizontal booms and a hoisting-tackle depending from each, of a single hinged boom supported at the outer ends of said fixed booms, a plurality of guys for sustaining the outer end of said hinged boom, and a plurality of hoists depending from said hinged boom, substantially as set forth.

JACOB H. GREINER.

Witnesses:
I. M. FEGELY,
L. M. HOPKINS.